United States Patent [19]

Wiezer et al.

[11] 4,409,348

[45] Oct. 11, 1983

[54] POLY-BIS-TRIAZINYLAMINO-TRIAZINYLAMINES, THEIR PREPARATION AND THEIR USE AS LIGHT STABILIZERS FOR PLASTICS, AND PLASTICS WHICH HAVE BEEN STABILIZED WITH THEM

[75] Inventors: Hartmut Wiezer, Gersthofen; Gerhard Pfahler, Augsburg, both of Fed. Rep. of Germany

[73] Assignee: Hoechst Aktiengesellschaft, Fed. Rep. of Germany

[21] Appl. No.: 374,085

[22] Filed: May 3, 1982

[30] Foreign Application Priority Data

May 7, 1981 [DE] Fed. Rep. of Germany ....... 3117964

[51] Int. Cl.$^3$ ..................... C07D 403/50, C08K 5/34; C08L 79/04
[52] U.S. Cl. .................................. 524/100; 525/186; 528/423; 544/198; 544/207; 544/209
[58] Field of Search ........................ 524/100; 525/186; 544/198, 207, 209; 528/423

[56] References Cited

U.S. PATENT DOCUMENTS

| | | | |
|---|---|---|---|
| 4,086,204 | 4/1978 | Cassandrini et al. | 524/100 |
| 4,234,728 | 11/1980 | Rody et al. | 524/100 |
| 4,294,963 | 10/1981 | Rody | 524/100 |
| 4,315,859 | 2/1982 | Nikles | 524/100 |
| 4,335,242 | 6/1982 | Wiezer et al. | 524/100 |
| 4,348,493 | 9/1982 | Loffelman | 524/100 |

*Primary Examiner*—John Kight, III
*Assistant Examiner*—R. A. White
*Attorney, Agent, or Firm*—Connolly and Hutz

[57] ABSTRACT

Poly-bis-triazinylaminotriazinylamines are prepared from cyanuric chloride, triazinylamines and two different diamino compounds. They are light stabilizers, of low volatility and resistant to migration, for synthetic polymers.

5 Claims, No Drawings

POLY-BIS-TRIAZINYLAMINOTRIAZINYLA-MINES, THEIR PREPARATION AND THEIR USE AS LIGHT STABILIZERS FOR PLASTICS, AND PLASTICS WHICH HAVE BEEN STABILIZED WITH THEM

A large number of polytriazinylamines having a polymeric structure are already known from the patent literature (German Offenlegungsschriften Nos. 2,636,144, 2,933,078, 3,022,896 and 3,045,839 and European Patent 13,665). It is also described that these compounds can be used as stabilizers for thermoplastics. However, the products of the state of the art no longer meet the increasing technical requirements in respect of all criteria relating to performance in use.

It has been found that poly-bis-triazinylaminotriazinylamines possessing a different structure are distinguished, compared with the known compounds, by a superior activity which could in no way have been foreseen.

The new poly-bis-triazinylaminotriazinylamines are described by the formula (I)

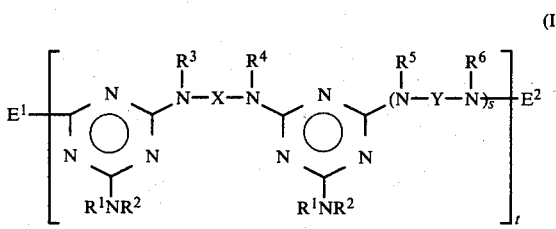

in which s is 0 or 1, preferably 1, t denotes an integer from 1 to 100, preferably 1 to 20 and, in particular, 1 to 5, $R^1$ and $R^2$ are identical or different and represent a group of the formula (II) or (III)

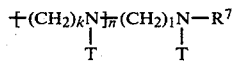

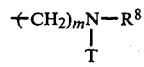

in which formulae k, l and m denote identical or different integers from 2 to 6, preferably 2 or 3, n represents an integer from 0 to 3, preferably 0 or 1 and, in particular, 0, and the radicals $R^7$ and $R^8$ are identical or different and represent hydrogen, $C_1$-$C_{18}$ alkyl, preferably $C_1$-$C_{12}$ alkyl and, in particular, $C_1$-$C_8$ alkyl, $C_5$-$C_{12}$ cycloalkyl, $C_7$-$C_9$ phenylalkyl or a group of the formula (IV)

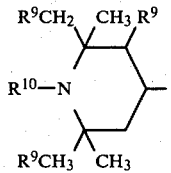

but very particularly represent hydrogen, and, in formula (IV), $R^9$ is hydrogen or methyl, preferably hydrogen, and $R^{10}$ is hydrogen, $C_1$-$C_{12}$ alkyl which can be substituted by 1 or 2 hydroxyl groups, $C_3$-$C_8$ alkenyl or benzyl, but is preferably hydrogen, T denotes a radical of the formula (V)

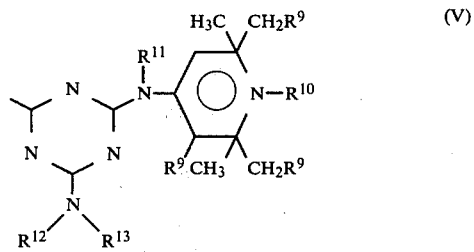

in which $R^9$ and $R^{10}$ are as indicated, and $R^{11}$ and $R^{12}$ represent identical or different radicals which denote hydrogen, $C_1$-$C_{18}$, preferably $C_1$-$C_{12}$ and, in particular, $C_1$-$C_8$, alkyl which can be substituted by hydroxyl, $C_1$-$C_{18}$ alkoxy or $C_1$ dialkylamino or $C_2$ dialkylamino, $C_2$ or $C_3$ alkyl being preferably substituted by $C_1$-$C_{18}$ alkoxy, in particular by $C_1$ or $C_2$ alkoxy or by $C_1$-$C_4$ dialkylamino, in particular $C_1$ dialkylamino or $C_2$ dialkylamino, or denote $C_5$-$C_{12}$ cycloalkyl which can be substituted by 1 to 4 $C_1$-$C_4$ groups, preferably methyl groups, or denote allyl, phenyl which can be substituted by up to 2 $C_1$-$C_8$ alkyl groups and/or by an OH group, $C_7$-$C_{14}$ aralkyl, preferably $C_7$-$C_{14}$ phenylalkyl, but particularly $C_7$-$C_9$ phenylalkyl, or a group of the formula (IV), while $R^{13}$ denotes hydrogen, $C_1$-$C_{18}$ alkyl, preferably $C_1$-$C_{12}$ alkyl and, in particular, $C_1$-$C_8$ alkyl, $C_5$-$C_{12}$ cycloalkyl, $C_7$-$C_{14}$ aralkyl, preferably $C_7$-$C_{14}$ phenylalkyl and, in particular, $C_7$-$C_9$ phenylalkyl, or, preferably, a group of the formula (IV), $R^3$, $R^4$, $R^5$ and $R^6$ are identical or different radicals $R^{13}$, and one of the radicals $R^5$ and $R^6$ is preferably hydrogen, but, in particular, both represent hydrogen, X and Y are identical or different and denote $C_2$-$C_{18}$ alkylene, preferably $C_2$-$C_{12}$ alkylene and, in particular, $C_2$-$C_6$ alkylene, $C_2$-$C_{12}$ bis-(propoxy)-alkylene, monocycloalkylene, dicycloalkylene or tricycloalkylene which has 6 to 18, preferably 6 to 12, C atoms and which can be substituted by up to four methyl groups, but is preferably unsubstituted and in which, moreover, up to two C atoms can be replaced by N atoms which can carry propylene groups, or denote $C_6$-$C_{18}$ arylene, preferably phenylene, or $C_7$-$C_{18}$ aralkylene, or the groupings

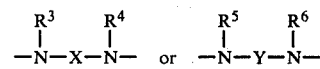

can be replaced by piperazinylene radicals, or the groupings

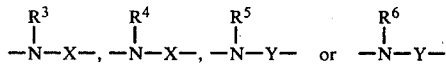

can be replaced by $C_5$-$C_9$ azamonocycloalkylene or azabicycloalkylene radicals which are substituted by up to four methyl groups, with the limitation that, if s=zero, X is not $C_2$-$C_6$ alkylene or $C_2$-$C_6$ alkylene which is interrupted by an oxygen atom, and, if s=1, either X alone or Y alone may be $C_2$-$C_6$ alkylene or $C_2$-$C_6$ alkylene which is interrupted by O, but X and Y are preferably dicycloalkylene or tricycloalkylene, $E^1$ is a chlorine atom or a group of the formula —$NR^{14}R^{15}$ in which $R^{14}$ and $R^{15}$ are identical or different and denote $R^1$ or $R^2$, and, if t=1, $R^{14}$ can also denote a radical $R^{11}$ or $R^{12}$, and $R^{15}$ can denote a radical $R^{13}$; $E^1$ can also be a group of the formula

but is preferably —$NR^{14}R^{15}$ or chlorine, particularly chlorine; $E^2$ is hydrogen if $s=1$, and, if $s=$zero, is chlorine or a group of the formula —$NR^{14}R^{15}$, preferably chlorine.

Finally, in formula (I), at least one of the radicals $R^1$, $R^2$, $R^3$, $R^4$, $R^5$ and $R^6$ must be a group of the formula (IV) or must contain this group.

The new poly-bis-triazinylaminotriazinylamines are obtained using as starting materials unsubstituted or partly substituted cyanuric halides, preferably cyanuric chlorides. The individual intermediates can be isolated, but it is also possible to carry out the synthesis in a so-called "one-pot process", without isolating the intermediate compounds.

Preferred routes of synthesis starting from cyanuric chloride are outlined in the scheme of reactions below.

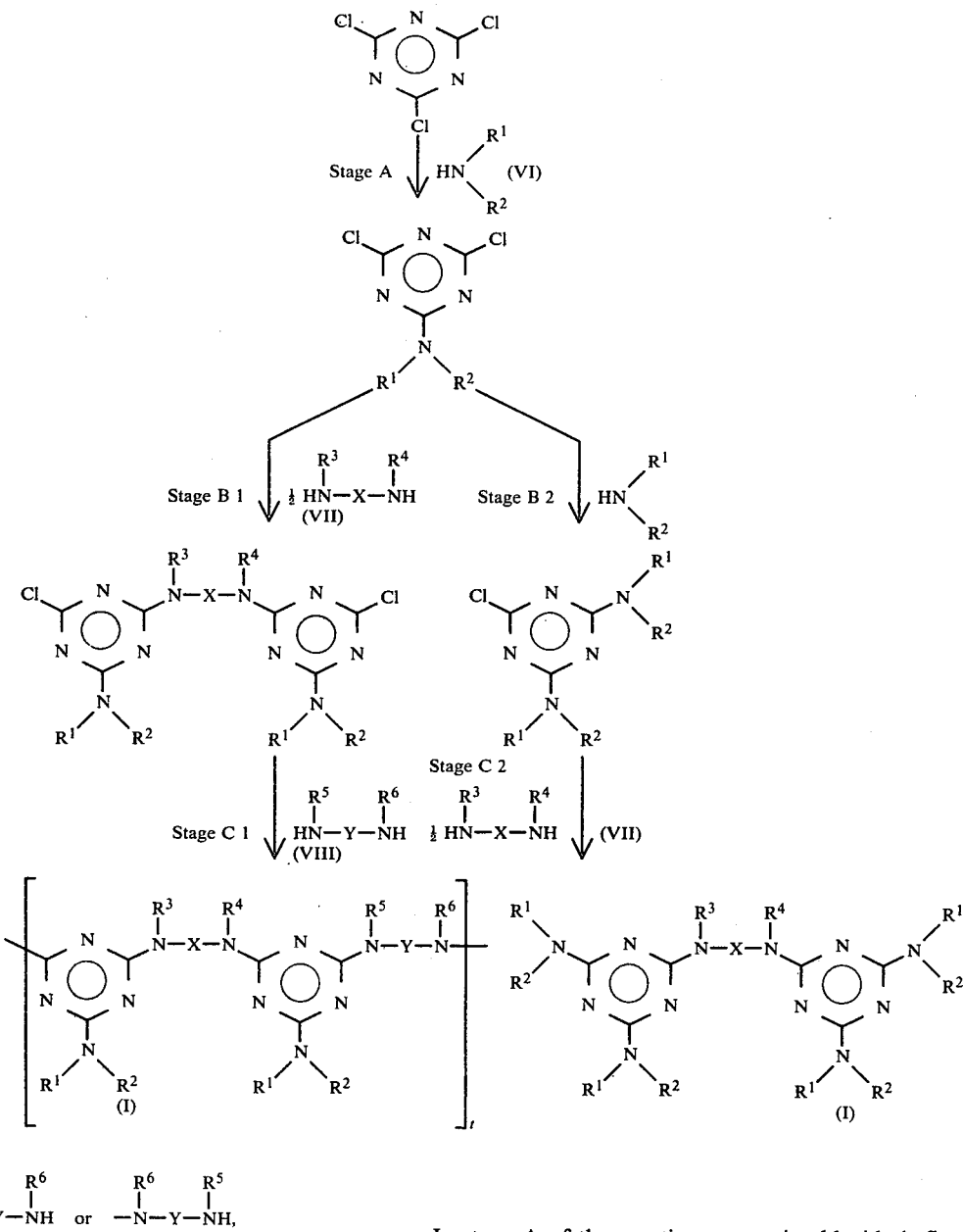

In stage A of the reaction, cyanuric chloride is first reacted at 0° to 40° C. with a 0.95-molar to 1.05-molar quantity, preferably an equimolar quantity, of an amine of the formula (VI)

$$HN\diagup^{R^1}_{\diagdown R^2} \qquad (VI)$$

in which $R^1$ and $R^2$ have the meanings indicated above.

In stage B of the reaction, the product obtained in A is reacted, at 10° to 70° C., either with a 0.45-molar to 0.55-molar, preferably 0.5-molar, quantity of a diamine of the formula (VII)

in which the radicals $R^3$, X and $R^4$ have the meanings indicated above (stage B 1), or with a 0.95-molar to 1.05-molar, preferably an equimolar, quantity of an amine of the formula (VI) or of the formula

(stage B 2)

In a stage C 1 of the reaction, the triazines prepared in accordance with B 1 are then reacted at 70° to 200° C. with a 0.95-molar to 1.05-molar, preferably equimolar, quantity of a diamine of the formula (VIII)

$$\begin{array}{cc} R^5 & R^6 \\ | & | \\ HN-Y-NH \end{array} \quad \text{(VIII)}$$

in which $R^5$, Y and $R^6$ have the meanings indicated above (route C 1) in order to synthesize compounds of the formula (I) in which s is 1, or, in a stage C 2 of the reaction, the products obtained in accordance with B 2 are reacted at 70° to 200° C. with a 0.45-molar to 0.55-molar, preferably 0.5-molar, quantity of a diamines of the formula (VII) (route C 2) in order to synthesize compounds in which s=zero and t=1.

In all the process stages and variants, the reactions are carried out in inert organic solvents, such as, for example, petroleum ether, petroleum fractions, acetone, ether, dioxane, benzene, toluene, xylene, cumene and mesitylene, or in mixtures of such solvents.

Process stage A requires reaction temperatures of 0 to 40, preferably 5 to 20 and, in particular, 5 to 10, °C. Process stage B is carried out at 10 to 70, preferably 40 to 70 and, in particular, 50 to 70, °C. The polycondensation according to process stage C is carried out at reaction temperatures of 70 to 200, preferably 100 to 180 and, in particular, 130 to 180, °C.

In the preparation of the new compounds, inorganic bases are added as hydrogen halide acceptors in equivalent quantities, relative to the amine employed. Examples of suitable bases are sodium hydroxide, potassium hydroxide, sodium carbonate and potassium carbonate, in a solid form or in aqueous solution.

The following are examples of starting materials of the formula (VI):
1. 1,9-Bis-[2,4-<N-(2,2,6,6-tetramethyl-4-piperidyl)-amino>-1,3,5-triazin-6-yl]-1,5,9-triazanonane
2. 1,9-Bis-[2,4-bis-<N-(2,2,6,6-tetramethyl-4-piperidyl)-butylamino>-1,3,5-triazin-6-yl]-1,5,9-triazanonane
3. 1,9-Bis-[2,4-<N-(2,2,6,6-tetramethyl-4-piperidyl)-3-methoxypropylamino>-1,3,5-triazin-6-yl]-1,5,9-triazanonane
4. 1,9-Bis-[2,4-bis-<N-(2,2,6,6-tetramethyl-4-piperidyl)-3-dimethylaminopropylamino>-1,3,5-triazin-6-yl]-1,5,9-triazanonane
5. 1,9-Bis-[2-cyclohexylamino-4-<N-(2,2,6,6-tetramethyl-4-piperidyl)-3-methoxypropylamino>-1,3,5-triazin-6-yl]-1,5,9-triazanonane
6. 1,7-Bis-[2,4-bis-<N-(2,2,6,6-tetramethyl-4-piperidyl)-3-methoxypropylamino>-1,3,5-triazin-6-yl]-1,4,7-triazaheptane
7. 1,8-Bis-[2,4-bis-<N-(2,2,6,6-tetramethyl-4-piperidyl)-3-dimethylaminopropylamino>-1,3,5-triazin-6-yl]-1,4,8-triazaoctane
8. 1,5,12-Tris-[2,4-bis-<N-(2,2,6,6-tetramethyl-4-piperidyl)-3-methoxypropylamino>-1,3,5-triazin-6-yl]-1,5,8,12-tetraazadodecane
9. 1,7-Bis-[2,4-bis-<N-(2,2,6,6-tetramethyl-4-piperidyl)-octadecylamino>-1,3,5-triazin-6-yl]-1,4,7-triazaheptane
10. 1,9-Bis-[2-dicyclohexylamino-4-<N-(tetramethyl-4-piperidyl)-3-methoxypropylamino>-1,3,5-triazin-6-yl]-1,5,9-triazanonane.

The following are examples of starting materials of the formulae (VII) and (VIII):
11. 1,2-Diaminoethane
12. 1,6-Diaminohexane
13. 4,7-Dioxadecane-1,10-diamine
14. 4,4'-Diaminodicyclohexylmethane
15. 1,3-Bis-(aminomethyl)-cyclohexane
16. 2(3),5(6)-Bis-(aminomethyl)-norbornane (mixture of isomers
17. 3(4),8(9)-Bis-(aminomethyl)-tricyclo[5,2,1,0$^{2,6}$]-decane (mixture of isomers)
18. 1-Amino-2-aminomethyl-3,3,5-trimethyl-cyclopentane
19. 1-Amino-3-aza-5,7,7-trimethyl-bicyclo-[3,3,1]-nonane
20. 3-Amino-1-methylaminopropane
21. 1,6-Bis-cyclododecylamino-hexane
22. N,N'-Bis-(2,2,6,6-tetramethyl-4-piperidyl)-ethylenediamine
23. N-(2,2,6,6-Tetramethyl-4-piperidyl)-1,6-diaminohexane
24. N-(2,2,6,6-Tetramethyl-4-piperidyl)-1,3-bis-(aminomethyl)-cyclohexane
25. N-(2,2,6,6-Tetramethyl-4-piperidyl)-3(4),8(9)-bis-(aminomethyl)-tricyclo-[5,2,1,0$^{2,6}$]-decane (mixture of isomers)
26. N-(2,2,6,6-Tetramethyl-4-piperidyl)-2(3),5(6)-bis-(aminomethyl)-norbornane (mixture of isomers)
27. N,N'-Bis-(2,2,6,6-tetramethyl-4-piperidyl)-1,6-diaminohexane
28. N,N'-Bis-(2,2,6,6-tetramethyl-4-piperidyl)-3(4),8(9)-bis-(aminomethyl)-tricyclo[5,2,1,0$^{2,6}$]-decane (mixture of isomers)
29. N,N'-Bis-(2,2,6,6-tetramethyl-4-piperidyl)-2(3),5(6)-bis-(aminomethyl)-norbornane (mixture of isomers)
30. N,N'-Bis-(2,2,6,6-tetramethyl-4-piperidyl)-1,3-bis-(aminomethyl)-cyclohexane
31. N-(2,2,6,6-Tetramethyl-4-piperidyl)-1,3-bis-(aminomethyl)-cyclohexane
32. N,N'-Bis-(3-aminopropyl)-piperazine
33. Piperazine.

The poly-bis-triazinylaminotriazinylamines according to the invention differ from the substances which are known, from the German Offenlegungsschriften quoted, as the state of the art, in regard to the radicals $R^1$ and $R^2$, in that, in these references, the radicals corresponding to these radicals do not contain triazine groups, and differ from the compounds of European Patent 13,665 both in that groups X and Y are of a different kind and in that in this reference only one identical triazine ring acts as the linkage in the recurring polymer chain unit. Furthermore, in the European patent just mentioned, the groups corresponding to X and Y only denote $C_2$–$C_6$ alkylene, whereas, in the stabilizers of the present invention, not more than one of the radicals X or Y is $C_2$–$C_6$ alkylene. In addition, the compounds of the European patent are crosslinked products, as is clearly evident from the process of preparation, whereas the products according to the invention are not crosslinked.

Finally, the superior effectiveness of the new compounds compared with those of German Offenlegungsschrift No. 3,045,839 and of European Patent 13,665, which constitute the nearest state of the art, was surprising and could not have been foreseen.

The new triazine stabilizers can be incorporated without problems into the polymers to be stabilized and stabilize the latter in an excellent manner against oxidative degradation, induced by light, caused by oxygen, heat and light. Besides their excellent effectiveness as stabilizers, they are distinguished by their compatibility with the polymers to be stabilized, their migration resistance against extraction by washing with aqueous media, their heat stability and their low volatility.

The following are examples of plastics which can be stabilized with the new substances:

Polymers derived from hydrocarbons having single or double unsaturation, for example polyolefins, such as polyethylene, which can optionally be crosslinked, polypropylene, polybut-1-ene, polyisobutene, polymethylbut-1-ene, polymethylpent-1-ene, polyisoprene, polybutadiene, polystyrene, copolymers of the monomers on which the homopolymers mentioned are based, such as ethylene-propylene copolymers, propylene-but-1-ene copolymers, propyleneisobutene copolymers and styrene-butadiene copolymers, and also terpolymers of ethylene and propylene with a diene, such as, for example, hexadiene, dicyclopentadiene or ethylidenenorbornene; mixtures of the abovementioned homopolymers, such as, for example, mixtures of polypropylene and polyethylene, polypropylene and polybut-1-ene, polypropylene and polyisobutylene or a butadiene-acrylonitrile copolymer and a styrene-butadiene copolymer.

Vinyl polymers containing halogen, such as polyvinyl chloride, polyvinylidene chloride, polyvinyl fluoride, polychloroprene and chlorinated rubbers, and copolymers of vinyl chloride and vinylidene chloride with one another and with other olefinically unsaturated monomers.

Polymers derived from α,β-unsaturated acids and derivatives thereof, such as polyacrylates and polymethacrylates, polyacrylamides and polyacrylonitrile, and copolymers thereof with one another and with other vinyl compounds, such as acrylonitrile-butadiene-styrene copolymers, acrylonitrile-styrene copolymers and acrylonitrile-styrene-acrylic ester copolymers.

Polymers derived from unsaturated alcohols and amines or acyl derivatives or acetals of the latter, such as polyvinyl alcohol, polyvinyl acetate, polyvinyl stearate, polyvinyl benzoate, polyvinyl maleate, polyvinyl butyral, polyallyl phthalate or polyallylmelamine and copolymers thereof with other vinyl compounds, such as ethylene/vinyl acetate copolymers.

Homopolymers and copolymers which are derived from epoxides, such as polyethylene oxide or the polymers derived from bis-glycidyl ethers.

Polyacetals, such as polyoxymethylene and polyoxyethylene and also polyoxymethylenes containing ethylene oxide as a comonomer.

Polyurethanes and polyureas.

Polycarbonates.

Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

Polyesters derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate.

Crosslinked polymers derived from aldehydes on the one hand and from phenols, ureas and melamines on the other hand, such as phenol-formaldehyde resins, urea-formaldehyde resins and melamine-formaldehyde resins.

Finally, the new compounds can also be employed as stabilizers in the field of resins and lacquers. Examples are thermosetting and thermoplastic acrylic resins which are used for lacquering automobiles, acrylic resin lacquers, ie. the customary stoving lacquers and, very particularly, mixtures based on a heat-crosslinkable acrylic resin and styrene, and lacquers and coatings based on acrylic/melamine and (alkyd)acrylic/melamine resins. Lacquers of this type can contain other customary light stabilizers, phenolic antioxidants, pigments, dyestuffs, metal deactivators and the like as further additives.

A field of particular importance is the stabilization of polyolefins, styrene polymers, polyamides, poly(meth-)acrylates and polyurethanes, for which the compounds are preferentially suitable. Examples of these are polyethylene of high and low density, polypropylene, ethylenepropylene copolymers, polystyrene and styrene-butadiene-acrylonitrile terpolymers; mixtures of polyolefins or of styrene polymers, and polyurethanes based on polyethers or polyesters.

The new stabilizers are incorporated into the polymer compositions by methods which are generally customary. The incorporation can be effected, for example, by mixing the compounds and, if appropriate, further additives into the melt by the methods customary in the art, before or during shaping, or by applying the compounds, in a dissolved or dispersed state, to the polymers directly or by mixing the compounds into a solution, suspension or emulsion of the polymers, if appropriate subsequently allowing the solvent to evaporate. The quantities are 0.01 to 5, preferably 0.05 to 2.5 and, in particular, 0.1 to 1.0, % by weight, relative to the material to be stabilized. The new compounds can also be added to the plastics to be stabilized in the form of a master batch containing these compounds, for example, in a concentration of 1 to 50, preferably 2.5 to 20, % by weight.

The plastics which are stabilized by adding the substances according to the invention can also contain, if appropriate, other known and customary additives, such as, for example, antioxidants based on phenols and sulfides, metal deactivators and light stabilizers, phosphite stabilizers, metal compounds, epoxy stabilizers and polyhydric alcohols.

Examples of antioxidants are sterically hindered phenols, such as 2,6-di-tert.-butyl-4-methylphenol, 4,4'-butylidene-bis-(2,6-di-tert.-butylphenol), 4,4'-thio-bis-(2-tert.-butyl-5-methylphenol), 2,5-di-tert.-butyl-4-hydroxyanisole, dioctadecyl 2,2-bis-(3,5-di-tert.-butyl-2-hydroxybenzyl)-malonate, 1,3,5-tris-(3,5-di-tert.-butyl-4-hydroxybenzyl)-2,4,6-trimethylbenzene and 2,4,6-tris-(3,5-di-tert.-butyl-4-hydroxybenzyl)-phenol, phenolic triazine compounds, such as 1,3,5-tris-(3,5-di-tert.-butyl-4-hydroxybenzyl) isocyanurate, esters of β-(3,5-di-tert.-butyl-4-hydroxyphenyl)-propionic acid with, for example, octadecanol, pentaerythritol and tris-hydroxyethyl isocyanurate, esters of 3,3-bis-(3-tert.-butyl-4-hydroxyphenyl)-butanoic acid with, for example, ethylene glycol, thiodipropionic acid esters with fatty alcohols, Ca or Ni salts of 3,5-di-tert.-butyl-4-hydroxybenzylphosphonic acid ethyl ester, dioctadecyl sulfide and dioctadecyl disulfide.

UV absorbers and light stabilizers include 2-(2'-hydroxyphenyl)-benztriazoles, such as, for example, the 5-chloro-3',5'-di-tert.-butyl and the 5-chloro-3',5'-di-tert.-amyl derivative, 2-hydroxybenzophenones, such as, for example, the 4-heptoxy or the 4-octoxy derivative, salicylates, such as octylphenyl salicylate, nickel complexes, such as, for example, the complex with 2,2'-thiobis-4-(1,1,3,3-tetramethylbutyl)-phenol and butylamine or other amines, oxalic acid diamides and sterically hindered amines.

Phosphites which should be mentioned are aliphatic, aromatic or aliphatic-aromatic phosphites, such as, for example, trisnonylphenyl phosphite, tris-(2,4-di-tert.-butylphenyl) phosphite, tris-(2-tert.-butylphenyl) phosphite or esters of pentaerythritol phosphite.

Metal compounds which are known as stabilizers are to be understood as meaning the following: the calcium, barium, strontium, zinc, cadmium, magnesium, aluminum and lead soaps of aliphatic carboxylic acids or hydroxycarboxylic acids having about 12 to 32 C atoms, salts of the said metals with aromatic carboxylic acids, such as benzoates or salicylates and also (alkyl)-phenates of these metals, and also organotin compounds, such as, for example, dialkyltin thioglycolates and carboxylates.

Examples of known epoxy stabilizers are epoxidized higher fatty acids, such as epoxidized soya bean oil, tall oil or linseed oil, or epoxidized butyl oleate and epoxides of long-chain olefins.

Polyhydric alcohols can be, for example, pentaerythritol, trimethylolpropane, sorbitol or mannitol, ie. preferably alcohols having 5 or 6 C atoms and 2 to 6 OH groups.

An effective combination of stabilizers for poly-$\alpha$-olefins, such as, for example, high-pressure, medium-pressure and low-pressure polymers of $C_2$–$C_4$ $\alpha$-olefins, in particular polyethylene and polypropylene, or copolymers of such $\alpha$-olefins is composed, relative to 100 parts by weight of polymer, of, for example, 0.01 to 5 parts by weight of one of the compounds to be used in accordance with the invention, 0.05 to 5 parts by weight of a phenolic stabilizer, if appropriate 0.01 to 5 parts by weight of a sulfur-containing co-stabilizer and also, if appropriate, 0.01 to 3 parts by weight of a basic or neutral metal soap, such as, for example, calcium stearate or zinc stearate or the corresponding oxides, and also, if appropriate, 0.01 to 5 parts by weight of a known UV stabilizer belonging to the group comprising the alkoxyhydroxybenzophenones, 4-hydroxyphenylbenztriazoles, benzylidenemalonic acid mononitrile-esters or the so-called quenchers, such as, for example, nickel chelates. Plasticizers, lubricants, emulsifiers, fillers, such as, for example, chalk, talc or asbestos, pigments, optical brighteners, fire-proofing agents and antistatic agents can be regarded as examples of other customary additives.

The plastics which are stabilized in accordance with the invention can be used in a very wide variety of forms, for example in the form of sheets, fibers, tapes or profiles or in the form of binders for lacquers, adhesives or plastic cements.

In the examples below, which serve to illustrate the invention in greater detail, the compounds employed are identified by numbers which refer to the substances listed on pages 9 to 12.

Since the process products have a resin-like structure, the melting points quoted are, of course, not sharp and are therefore quoted as "approx.".

EXAMPLE 1

150 ml of toluene, 75 ml of acetone and 3.7 g (0.02 mole) of cyanuric chloride were initially placed in a 250 ml stirred apparatus. 35.4 g (0.02 mole) of compound 8 were then added in portions at 0° to 10° C. and 0.8 g (0.02 mole) of NaOH, dissolved in 10 ml of water, was added dropwise at 10° C. in the course of 3 hours, and the mixture was stirred for a further hour at 10° C. 4.7 g (0.01 mole) of compound 28 were then added, the mixture was heated to 60° C. and a solution of 0.8 g (0.02 mole) of NaOH in 10 ml of water was added dropwise at 60° C. in the course of 2 hours. The mixture was stirred for a further hour and the organic phase was then separated off and concentrated in vacuo.

Yield: 42.0 g=99.8% of theory. Melting point approx. 155° C.

EXAMPLES 2 TO 4

The reaction was carried out as in the previous example, using other starting triazine compounds and diamines.

| Example No. | Educt 1 = Compound No. (g = mole) | Educt 2 = Compound No. (g = mole) | Process product (mp °C.) |
|---|---|---|---|
| 1 | 8 (35.4 = 0.02) | 25 (3.9 = 0.01) | ~155 |
| 3 | 9 (18.8 = 0.01) | 15 (1.0 = 0.005) | ~100 |
| 4 | 5 (18.7 = 0.02) | 30 (2.0 = 0.01) | ~250 |

EXAMPLE 5

A mixture composed of 5.8 g (0.005 mole) of N,N'-bis-[2-chloro-4-<N-(2,2,6,6-tetramethyl-4-piperidyl)-3-methoxypropylamino>-1,3,5-triazin-6-yl]-N,N'-bis-(aminomethyl)-tricyclo-[5,2,1,0$^{2,6}$]-decane (mixture of isomers) (educt 1), 11.0 g (0.01 mole) of compound 10 (educt 2), 0.4 g (0.01 mole) of NaOH powder and 100 ml of xylene was boiled under reflux for 13 hours in a 250 ml stirred apparatus. The mixture was filtered while hot, the filtrate was concentrated in vacuo and the residue was dried at 120° C. in vacuo. 15.7 g of a pale, solid resin were obtained; melting point ~120° C.

EXAMPLES 6 TO 11

The reaction was carried out as in Example 5, using equivalent quantities of NaOH.

| Example No. | Educt 1 = Compound of ... (g = mole) | Educt 2 = Compound No. (g = mole) | Process product mp (°C.) |
|---|---|---|---|
| 6+ | Example 1 (21.0  0.005) | 17 (1.0 = 0.005) | ~165 |
| 7+ | Example 1 (21.0  0.005) | 12 (0.6 = 0.005) | ~130 |
| 8 | Example 4 (11.5  0.005) | 27 (2.0 = 0.005) | ~190 |
| 9 | Example 4 (11.5  0.005) | 13 (0.9 = 0.005) | ~190 |
| 10 | Example 3 (20.9  0.005) | 14 (1.1 = 0.005) | ~75 |
| 11+ | Example 2 | " | ~135 |

-continued

| Example No. | Educt 1 = Compound of... (g = mole) | Educt 2 = Compound No. (g = mole) | Process product mp (°C.) |
| --- | --- | --- | --- |
| 12 | (20.5  0.005) Example 2 (20.5  0.005) | 19 (0.9 = 0.005) | ~135 |

+mesitylene was used as solvent; reaction time 20 hours

EXAMPLE 13

50 ml of mesitylene and 3.7 g (0.02 mole) of cyanuric chloride were initially placed in a 250 ml stirred apparatus. A solution of 50 ml of mesitylene and 23.3 g (0.02 mole) of compound 6 (educt 1) was added dropwise at 0° to 5° C. After 1.6 g (0.02 mole) of 50% strength NaOH had been added, stirring was continued for a further 5 hours at 10° C. 9.5 g (0.02 mole) of compound 28 (educt 2) were then added, after which the mixture was heated to reflux temperature, 1.6 g (0.04 mole) of NaOH powder were added and the mixture was stirred for 10 hours at 120° to 130° C. It was filtered while hot, the filtrate was evaporated in vacuo on a rotary evaporator, and the residue was dried for 4 hours at 120° C. in a high vacuum. This gave 33.5 g of a pale, brittle resin (melting range approx. 180° to 220° C.).

EXAMPLES 14 AND 15

The reaction was carried out as indicated in Example 13.

| Example No. | Educt 1 = Compound No. (g = mole) | Educt 2 = Compound No. (g = mole) | Process product mp (°C.) |
| --- | --- | --- | --- |
| 14 | 6 (23.3 = 0.02) | 29 (5.6 = 0.02) | 160–90 |
| 15+ | 4 (25 = 0.02) | 17 (4.0 = 0.02) | >250 |

+xylene used as solvent

EXAMPLE 16

80 ml of toluene, 40 ml of acetone and 1.8 g (0.01 mole) of cyanuric chloride were initially placed in a 250 ml stirred apparatus. 35.4 g (0.02 mole) of compound 8 were added at 20° C., the mixture was heated to 60° C. and a solution of 0.8 g (0.02 mole) of NaOH in 10 ml of water was added dropwise in the course of 3 hours. The organic phase was separated off and concentrated to dryness in vacuo. Yield 36.3 g, melting point ~150° C.

EXAMPLE 17

17.3 g (0.005 mole) of the compound obtained in Example 16, 0.5 g (0.0025 mole) of compound 17, 0.2 g (0.005 mole) of NaOH powder and 100 ml of mesitylene were stirred for 15 hours at 150° C. in a 250 ml stirred apparatus. The mixture was then filtered and the filtrate was concentrated in vacuo. This gave 16.5 g of a resin, melting point ~170° C.

EXAMPLE 18

This example shows the volatility of the new triazine stabilizers compared with a product of the nearest state of the art.

The volatility figures were determined in an apparatus for thermogravimetric analysis. Equal quantities (500 mg) of the compounds according to the invention and of the comparison substance were heated to 300° C. in a nitrogen atmosphere at a rate of heating of 2 K/minute, for this determination, and the loss of substance in mg/cm$^2$ of surface of sample was measured. The results are shown in the table below.

| Stabilizer according to Example | Loss of weight in mg/cm$^2$ on reaching ... °C. | | | |
| --- | --- | --- | --- | --- |
| | 220 | 260 | 300 | 10 minutes at 300° C. |
| Comparison+ | 0.31 | 0.96 | 2.84 | 3.36 |
| 13 | 0 | 0 | 0.95 | 1.90 |
| 11 | 0 | 0.63 | 1.85 | 2.21 |

+Stabilizer according to Example 18 of German Offenlengungsschrift 3,045,839

EXAMPLE 19

A homogeneous mixture was prepared in a laboratory high-speed mixer for polypropylene powder (®Hostalen PPU VP 1770 F made by Hoechst AG) of melt index MFI 190/3 = 1.9 g/10 minutes, see DIN 53,535 and the constituents of the formulation indicated below, and was converted into granules. The material stabilized in this way was then melted in a laboratory extruder under the customary processing conditions and was spun via a spunning pump having an eight-orifice spinning head into monofilaments, which were then subsequently stretched in a ratio of 1:3, texturized to give yarn of 40 dtex and processed to give test fabrics. The test fabrics required as comparison samples were prepared analogously, but omitting the stabilizer to be tested or adding the comparison stabilizers.

100 parts by weight of polypropylene, 0.2 part by weight of calcium stearate, 0.1 part by weight of ethylene glycol 3,3-bis-(3-tert.-butyl-4-hydroxyphenyl)-butanoate, 0.1 part by weight of dioctadecyl disulfide and 0.3 part by weight of the stabilizer to be tested.

The samples of fabric were stretched over a perforated piece of cardboard in such a way that a free aperture of approx. 15.5 mm diameter remained. The stability to light was determined by subjecting the samples to irradiation with alternating light in a Xenotest-1200 apparatus made by Original Hanau Quarzlampen GmbH. The intensity of radiation was modulated by UV filters (special filter glass d = 1.7 mm). The stability to light was tested as specified in DIN 53,387 (17 minutes dry period, 3 minutes sprinkling, black body temperature 45° C. and a relative atmospheric humidity of 70 to 75%) during the dry period), by loading the fabric at its center with a weight of diameter 6 mm and applying a pressure of 0.1 N/mm$^2$ at specified intervals of time. The perforation of the weight was taken as the point of failure.

| Stabilizer according to Example | Exposure time in hours |
| --- | --- |
| Comparison+ | >3,100[1] |
| Comparison++ | 2,900 |
| Comparison+++ | 400 |
| Polypropylene | <280 |
| 13 | >3,100[1] |
| 11 | >3,100[1] |

+Stabilizer according to Example 18 of German Offenlegungsschrift 3,045,839
++Stabilizer according to Example 46 of European Patent 13,665
+++No stabilizer
[1]Weight had not yet perforated

EXAMPLE 20

The stabilized granules, prepared as in the preceding example, were processed on a laboratory film blowing apparatus (screw diameter 25 mm, length 20 D, temperature program 200°, 240°, 250° and 255° C.) to give blown film of a thickness of approx. 70 μm. These films were subjected to artificial weathering in the Xenotest X 1200 as described in Example 19. The carbonyl number was determined by a method based on DIN 53,383, Part 2, as a criterion of damage (this number is defined for PP as the ratio of the extinction values at 1715 $cm^{-1}$ and 1524 $cm^{-1}$. Degradation of the test specimens into powder begins at a CO number $>2$).

| Stabilizer according to Example | C = 0 number after ... hours | | | |
|---|---|---|---|---|
| | 500 | 1,000 | 2,000 | 2,500 |
| Polypropylene | >2 | — | — | — |
| Comparison+ | <0.1 | <0.1 | 0.3 | 0.5 |
| Comparison++ | <0.1 | 0.1 | 0.4 | 0.7 |
| Comparison+++ | >2 | — | — | — |
| 13 | <0.1 | <0.1 | 0.2 | 0.4 |
| 11 | <0.1 | <0.1 | 0.3 | 0.4 |

+Stabilizer according to Example 18 of German Offenlegungsschrift 3,045,839
++Stabilizer according to Example 46 of European Patent 13,665
+++No stabilizer

We claim:
1. A poly-bis-triazinylaminotriazinylamine of the formula (I)

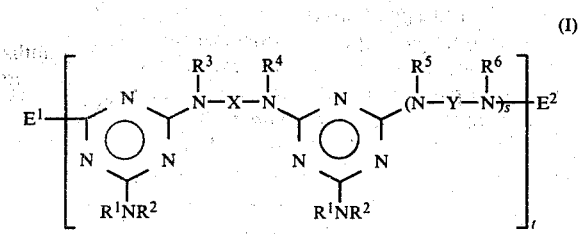

in which s is 0 or 1, t denotes an integer from 1 to 100 and $R^1$ and $R^2$ are identical or different and represent a group of the formula (II) or (III)

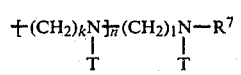

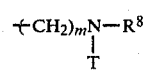

in which formulae k, l and m denote identical or different integers from 2 to 6 and n denotes an integer from 0 to 3, $R^7$ and $R^8$ are identical or different and represent hydrogen, $C_1$–$C_{18}$ alkyl, $C_5$–$C_{12}$ cycloalkyl, $C_7$–$C_9$ phenylalkyl or a group of the formula (IV)

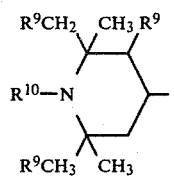

in which $R^9$ is hydrogen or methyl and $R^{10}$ is hydrogen, $C_1$–$C_{12}$ alkyl which can be substituted by 1 or 2 hydroxyl groups, $C_3$–$C_8$ alkenyl or benzyl, and T denotes a radical of the formula (V)

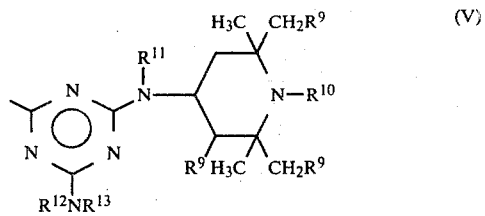

in which $R^9$ and $R^{10}$ have the meanings indicated above, $R^{11}$ and $R^{12}$ are identical or different radicals which denote hydrogen, $C_1$–$C_{18}$ alkyl which can be substituted by hydroxyl, $C_1$–$C_{18}$ alkoxy or $C_1$–$C_2$ alkylamino, or denote $C_5$–$C_{12}$ cycloalkyl which can be substituted by 1 to 4 $C_1$–$C_4$ alkyl groups, or denote allyl, phenyl which can be substituted by up to two $C_1$–$C_8$ alkyl groups and/or by an OH group, $C_7$–$C_{14}$ aralkyl or a group of the formula (IV), and $R^{13}$ denotes hydrogen, $C_1$–$C_{18}$ alkyl, $C_5$–$C_{12}$ cycloalkyl, $C_7$–$C_{14}$ aralkyl or a group of the formula (IV), $R^3$, $R^4$, $R^5$ and $R^6$ represent identical or different radicals $R^{13}$, X and Y are identical or different and denote $C_2$–$C_{18}$ alkylene, $C_2$–$C_{12}$ bis-(propoxy)-alkylene or monocycloalkylene, dicycloalkylene or tricycloalkylene which has 6 to 18 C atoms and which can be substituted by up to four methyl groups and in which, moreover, up to two C atoms can be replaced by N atoms which can carry propylene groups, or denote $C_6$–$C_{18}$ arylene or $C_7$–$C_{18}$ aralkylene, or the groupings

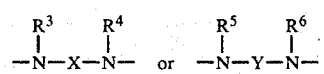

can be replaced by piperazinylene radicals, or the groupings

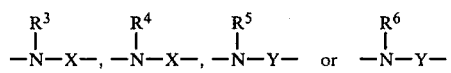

can be replaced by $C_5$–$C_9$ azamonocycloalkylene or azabicycloalkylene radicals which can be substituted by up to four methyl groups, with the limitation that, if s=zero, X is not $C_2$–$C_6$ alkylene or $C_2$ to $C_6$ alkylene which is interrupted by 0, and, if s=1, either X alone or Y alone may be $C_2$–$C_6$ alkylene or $C_2$–$C_6$ alkylene which is interrupted by 0, $E^1$ represents Cl or a group of the formula —$NR^{14}R^{15}$,

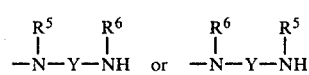

in which $R^{14}$ and $R^{15}$ are identical or different and denote $R^1$ or $R^2$, and, if t=1, $R^{14}$ can also denote a radical $R^{11}$ or $R^{12}$ and $R^{15}$ can denote a radical $R^{13}$, and $E^2$ is H, Cl or —$NR^{14}R^{15}$, and, in formula (I), at least one of the radicals $R^1$, $R^2$, $R^3$, $R^4$, $R^5$ and $R^6$ denotes a group of the formula (IV) or contains this group.

2. A process for the preparation of the compounds as claimed in claim 1, which comprises, firstly,
   (A) reacting cyanuric chloride at 0° to 40° C. with a 0.95-molar to 1.05-molar quantity of an amine of the formula (VI)

(VI)

in which $R^1$ and $R^2$ have the meaning indicated in claim 1, then either (B1) reacting, at 10° to 70° C., the products thus obtained with a 0.45-molar to 0.55-molar quantity of a diamine of the formula (VII)

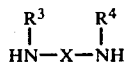
(VII)

in which $R^3$, X and $R^4$ have the meaning indicated in claim 1, or (B2) reacting, at 10° to 70° C., the products thus obtained with a 0.95-molar to 1.05-molar quantity of an amine of the formula (VI) or of the formula

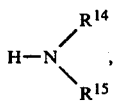
, and then, in a process stage (C1) reacting, at 70° to 200° C., the triazines obtained in accordance with B1 with a 0.95-molar to 1.05-molar quantity of a diamine of the formtula (VIII)

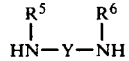
(VIII)

in which $R^5$, Y and $R^6$ have the meaning indicated in claim 1, and thus obtaining compounds of the formula (I) in which s=1, or, in a process stage C2, in order to prepare products of the formula (I) in which s=zero and t=1, reacting the triazines obtained in accordance with B2, at 70° to 200° C., with a 0.45-molar to 0.55-molar quantity of a diamine of the formula (VII), the reactions being carried out, in all variants or process stages, in inert organic solvents and in the presence of an equivalent quantity, relative to the amine employed, of an inorganic base, it being also possible to carry out the individual reaction stages without isolating the intermediate products.

3. A process for stabilizing synthetic polymers against the harmful effects of light, which comprises adding 0.01 to 5 parts by weight, relative to the polymer, of a compound as claimed in claim 1 to the polymers, if appropriate together with known substances which have a stabilizing action.

4. The process as claimed in claim 3, wherein the synthetic polymers to be stabilized are polyolefins, polyacrylates, polymethacrylates or homopolymers or homopolymers or copolymers of styrene.

5. Synthetic polymers which have been stabilized against decomposition by UV light and which contain 0.01 to 5 parts by weight, relative to the polymer, of a compound as claimed in claim 1.

* * * * *